United States Patent
Nakamura

(10) Patent No.: US 6,892,280 B2
(45) Date of Patent: May 10, 2005

(54) MULTIPROCESSOR SYSTEM HAVING DISTRIBUTED SHARED MEMORY AND INSTRUCTION SCHEDULING METHOD USED IN THE SAME SYSTEM

(75) Inventor: Takaki Nakamura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 126 days.

(21) Appl. No.: 10/173,105

(22) Filed: Jun. 18, 2002

(65) Prior Publication Data

US 2003/0088636 A1 May 8, 2003

(30) Foreign Application Priority Data

Nov. 7, 2001 (JP) ........................................ 2001-341433

(51) Int. Cl.[7] .............................................. G06F 12/00
(52) U.S. Cl. ...................... 711/137; 711/119; 711/147; 707/207
(58) Field of Search ............................... 711/137, 145, 711/119, 147–148; 707/207

(56) References Cited

U.S. PATENT DOCUMENTS 5,623,608 A * 4/1997 Ng .............................. 711/137
6,615,322 B2 * 9/2003 Arimilli et al. ............. 711/145

FOREIGN PATENT DOCUMENTS

JP 10-283192 4/1997
JP 2000-339157 5/1999

* cited by examiner

Primary Examiner—Mano Padmanabhan
Assistant Examiner—Thang Ho
(74) Attorney, Agent, or Firm—Reed Smith L.L.P.; Stanley P. Fisher, Esq.; Juan Carlos A. Marquez, Esq.

(57) ABSTRACT

In multiprocessing system executing processing called NUMA prefetch, when a prefetch instruction is issued to a prefetch unit, an address converter converts an address specified by an operand of the instruction into a physical address. A prefetch type determiner determines whether the instruction is an NUMA prefetch instruction or a conventional perfect prefetch instruction. If the instruction is an NUMA prefetch instruction, an address determiner determines whether the physical address is a local address or a remote address. If the address is a local address, the processing of the prefetch instruction is terminated. If the address is a remote address, a cache tag checker checks a cache. When cache hit occurs, the processing is terminated. When cache mishit occurs, a prefetch request is issued to a main storage controller. As a result, data is prefetched from a remote main storage to a cache in a local main storage.

4 Claims, 7 Drawing Sheets

FIG. 8

| NUMBER OF CYCLES | INSTRUCTION CODE ACCORDING TO PRIOR ART<br><br>r2=0<br>r3=1 | INSTRUCTION CODE ACCORDING TO EMBODIMENT OF PRESENT INVENTION<br><br>r2=0<br>r3=1 |
|---|---|---|
| 1 | pft    L1, & A (1) | npft    L2, & A (1) |
| 2 | pft    L1, & A (2) | npft    L2, & A (2) |
| 3 | pft    L1, & A (3) | npft    L2, & A (3) |
| 4 | pft    L1, & A (4) | npft    L2, & A (4)<br>pft    L1, & A (1) |
| 5 | pft    L1, & A (5) | npft    L2, & A (5)<br>pft    L1, & A (2) |
| r3+5 | LOOP :<br><br>pft    L1, & A (r3+5)<br>ld    r1, & A (r3)<br>add    r2, r2, r1<br>add    r3, r3, 1<br>brc    LOOP, (r3<=N) | LOOP :<br><br>npft    L2, & A (r3+5)<br>pft    L1, & A (r3+2)<br>ld    r1, & A (r3)<br>add    r2, r2, r1<br>add    r3, r3, 1<br>brc    LOOP, (r3<=N) |

MULTIPROCESSOR SYSTEM HAVING DISTRIBUTED SHARED MEMORY AND INSTRUCTION SCHEDULING METHOD USED IN THE SAME SYSTEM

BACKGROUND OF THE INVENTION

The present invention relates to a multiprocessor system having distributed shared memory, and in particular, to a multiprocessor system having distributed shared memory capable of executing instructions to efficiently execute a program and of conducting instruction scheduling to efficiently execute a program.

Recently, the operation speed of instruction processors has been remarkably increased as a result of development of semiconductor processes and logical processing methods.

In contrast therewith, the main storage is required to be increased in storage capacity and it is difficult to increase the operation speed of the storage. The main storage access efficiency is therefore a bottleneck of the system efficiency.

This problem can be solved by, for example, a method in which a high-speed, small-capacity data cache is disposed near an instruction processor to copy part of the main storage onto the cache.

When the instruction processor processes a load instruction, the processor reads data from the main storage to write the data in a register and registers the data to the data cache at the same time.

When a load instruction is issued for such data thus registered to the cache, the instruction processor can execute the loading operation for the data cache without accessing the main storage.

In general, in consideration of localization of an access pattern in the main storage, the system registers not only actually required data, i.e., critical data but also other associated data. Specifically, the data registration is conducted in block unit (for each line) in which each block includes data of several tens of bytes at continuous addresses.

When data to be used by a load instruction can be predicted, the method of JP-A-10-283192 published on Oct. 23, 1998 can be used in which a prefetch instruction is employed to beforehand registers the data to a data cache.

If the prefetch instruction can be issued in advance sufficient to complete the registration of the associated data to the data cache before the load instruction is processed, the instruction processor can obtain the necessary data from the data cache for the load instruction.

As described in JP-A-2000-339157 laid-open on Dec. 8, 2000, recent computer systems include data caches configured in a hierarchic order such that a prefetch instruction can be issued with specification of a cache at a desired level for the data registration.

On the other hand, shared memory systems includes a uniform memory access (UMA) system in which memory access latency is fixed regardless of a physical address to be accessed as shown in FIG. 2 and a non-uniform memory access (NUMA) system in which the memory access latency varies depending on a physical address to be accessed as shown in FIG. 3.

The UMA system includes a plurality of processors, a main storage controller, and a main storage.

The NUMA system is a composite system including nodes coupled by an inter-node interface with each other in which each node includes a plurality of processors, a main storage controller, and a main storage.

In the NUMA system, when a memory address of a request issued from a processor belongs to a node to which the processor belongs, the request is processed with short latency, i.e., local access latency, and when the memory belongs to a node other than a node to which the processor belongs, the request is processed with long latency, i.e., remote access latency.

The prefetch technique is particularly effective in the UMA system. The memory access latency is fixed. Therefore, when a program using the prefetch technique is complied by a compiler, the compiler can relatively easily schedule prefetch instructions in the program.

In the NUMA system, it is difficult for the compiler to assume or to estimate the memory access latency in the program compilation, and hence it is also difficult to schedule the prefetch instructions.

For example, the compiler can schedule all or perfect prefetch instructions for the remote access latency.

However, two problems arise also in this case.
Problem 1: Resources to control the prefetch being processed in the processor are kept occupied for a longer period of time (associated with the remote access latency) when compared with the UMA system.
Problem 2: When the data is too early registered to the cache of the processor, another data item at another address may possibly be written on the data before the data is used depending on cases.

For the NUMA multiprocessor system of the prior art, it is difficult to efficiently schedule prefetch instructions.

SUMMARY OF THE INVENTION

It is therefore one object of the present invention to execute, in an NUMA multiprocessor system, a prefetch instruction in a suitable manner for the NUMA configuration and to provide an instruction schedule to efficiently use prefetch instructions.

According to one aspect of the present invention, there is provided a multiprocessor system having distributed shared memory, comprising a plurality of nodes connected via an inter-node interface, the node including one or more processors, a main storage controller, and a main storage, wherein each of the processors comprises instruction executing means for determining whether an address specified in an instruction to be executed is associated with a local node or a remote node and for changing contents of processing of the instruction according to a result of the determination.

Moreover, the instruction is a prefetch instruction.

In addition, the instruction executing means does not conduct a prefetch operation if the address specified in the instruction is associated with a local node and issues a prefetch request only if the address is associated with a remote node.

According to another aspect of the present invention, there is provided a multiprocessor system having distributed shared memory, comprising a plurality of nodes connected via an inter-node interface, the node including one or more processors, a main storage controller, and a main storage, wherein each of the processors comprises instruction executing means for executing an NUMA prefetch instruction, the instruction executing means does not conduct a prefetch operation if the address specified in the NUMA prefetch instruction is associated with a local node and issues, only if the address is associated with a remote node, a prefetch request to a main storage controller of a local node.

Furthermore, the main storage controller of the local node comprises means for reading, when the prefetch request is received, data via a main storage controller of the remote node from a main storage of the remote node, the data being at the address specified in the NUMA prefetch instruction and for storing the data in a cache disposed in a main storage of the local node.

According to still another aspect of the present invention, there is provided an instruction scheduling method for use in a multiprocessor system having distributed shared memory and comprising a plurality of nodes connected via an inter-node interface, the node including one or more processors, a main storage controller, and a main storage, the method being used in each of the processors, wherein each of the processors issues, before a perfect prefetch instruction for an address block of data to be used by the processor, the NUMA prefetch instruction for the same address block.

The processor issues, after the NUMA prefetch instruction for the address block, the perfect prefetch instruction for the address block when a period of time fully lapses for termination of execution the NUMA prefetch instruction.

Other objects, features and advantages of the invention will become apparent from the following description of the embodiments of the invention taken in conjunction with the accompanying drawings.

BRIEF DESCRIPTION OF THE DRAWINGS

FIG. 8 is diagram showing an instruction schedule example using a perfect prefetch instruction of the prior art and an instruction schedule example using an NUMA prefetch instruction and a perfect prefetch instruction.

DESCRIPTION OF THE EMBODIMENTS

Figure 1:
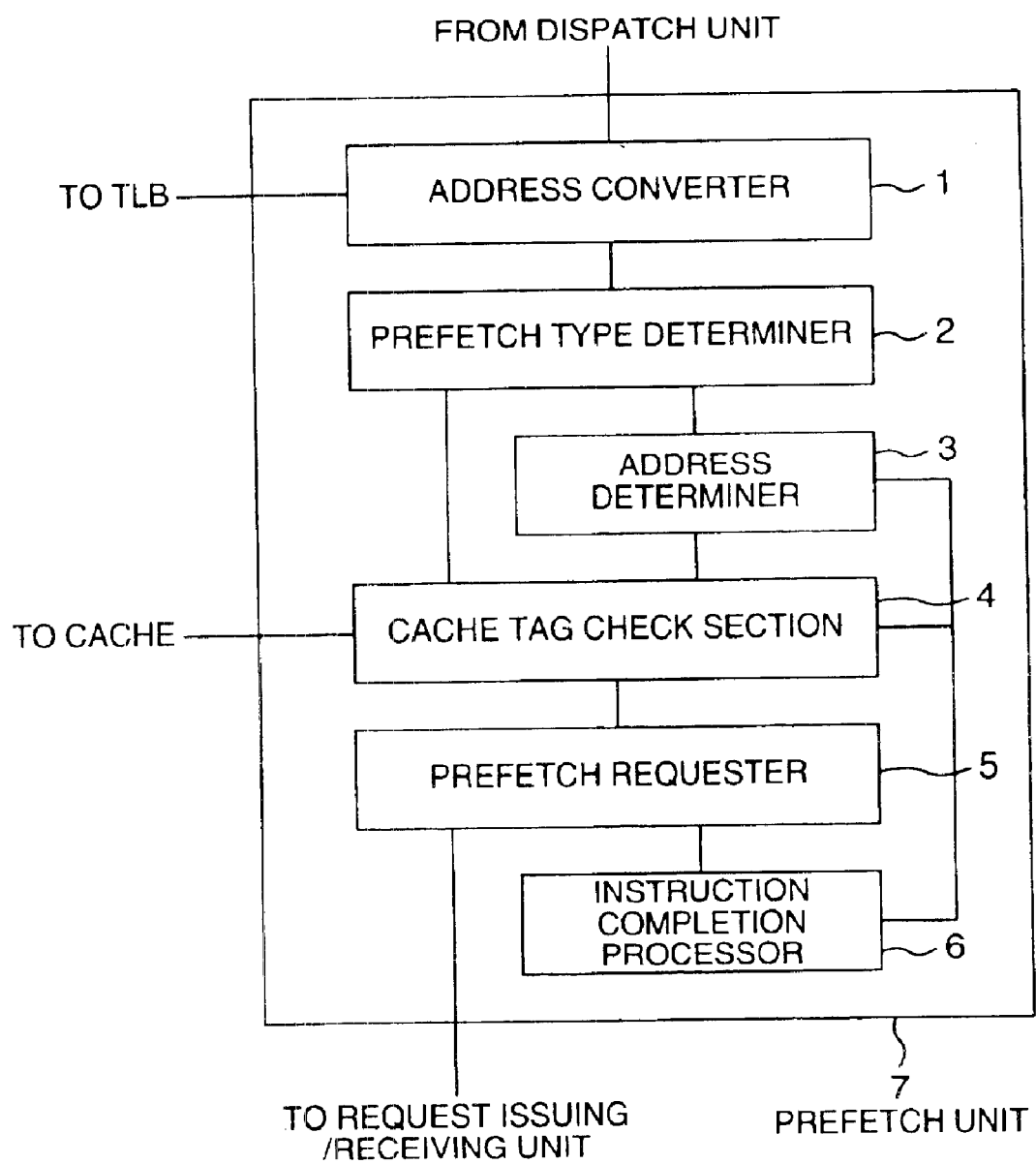
FIG. 1 is a schematic diagram showing a configuration example of a prefetch unit in an embodiment of the present invention.
Figure 2:
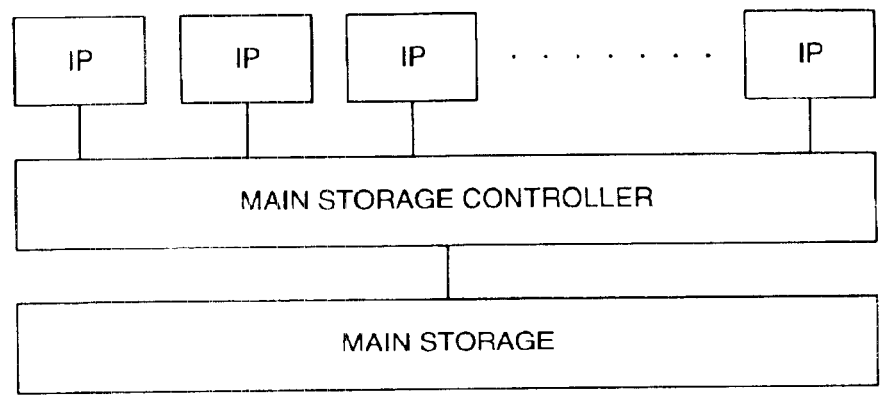
FIG. 2 is a diagram showing a configuration of a UMA system of the prior art.
Figure 3:
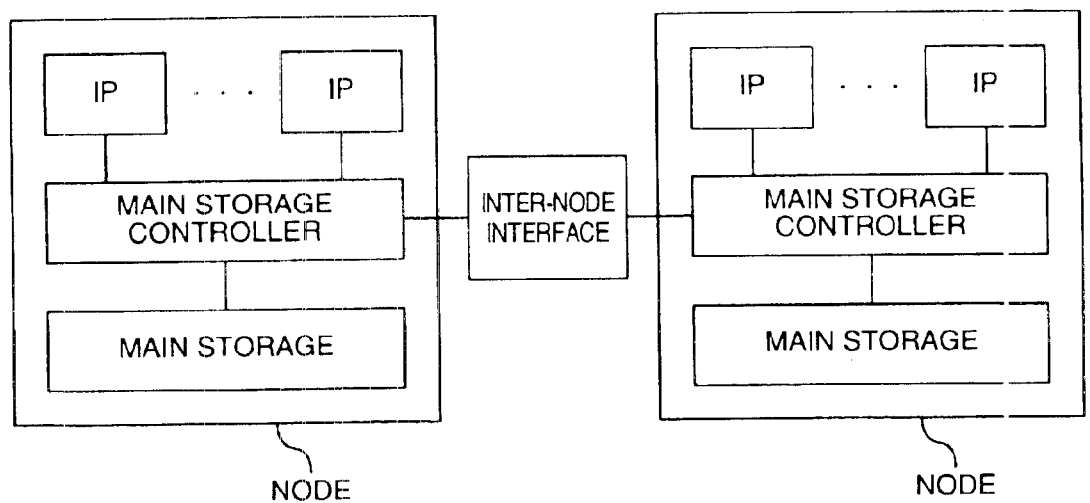
FIG. 3 is a diagram showing a configuration of an NUMA system of the prior art.

Description will now be given in more detail of processing of an NUMA prefetch instruction by referring to the drawings.

Figure 5:
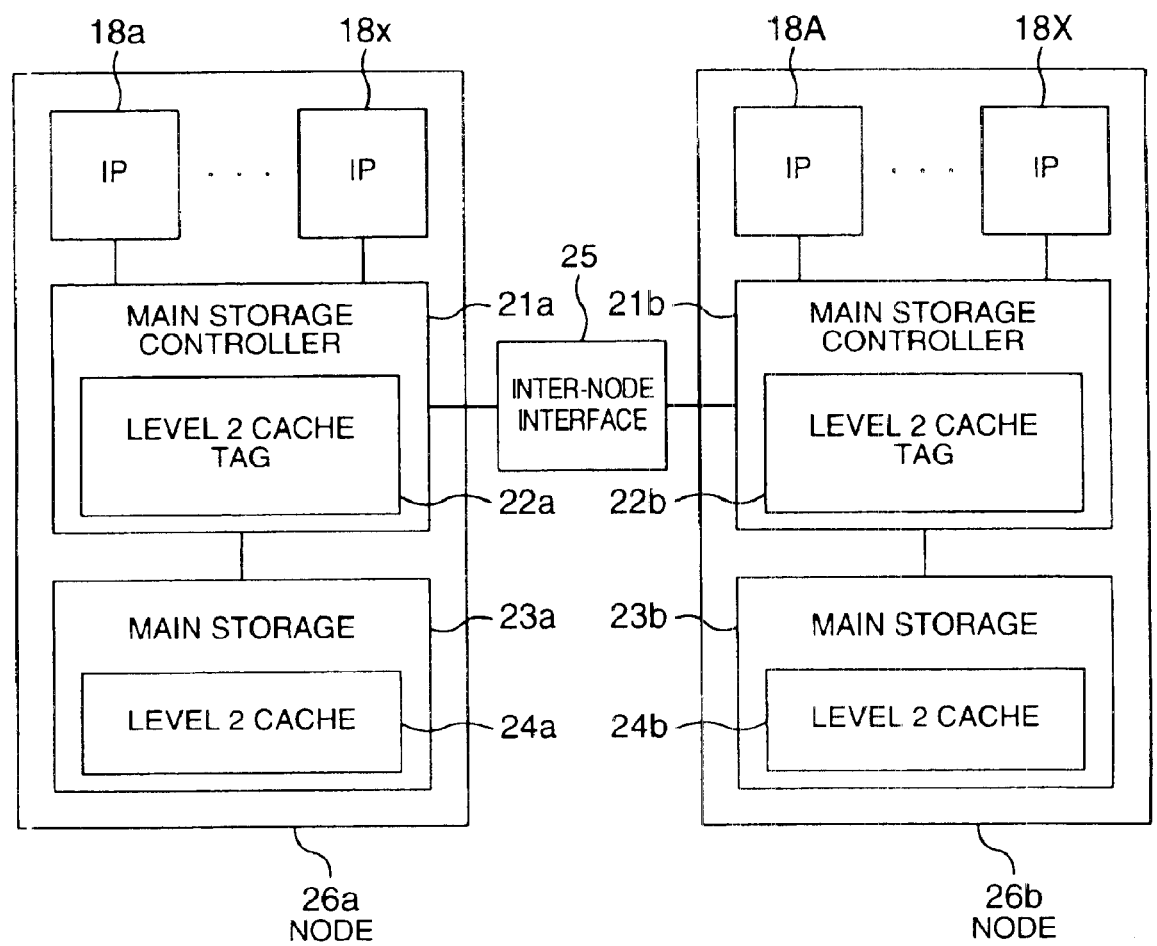
FIG. 5 is a diagram showing a configuration example of an NUMA system in an embodiment of the present invention.

FIG. 5 shows an NUMA computer or multiprocessor system in an embodiment of the present invention. Although the embodiment includes two nodes, an arbitrary number of nodes can be used.

The NUMA multiprocessor system includes nodes 26 connected by an inter-node interface 25 to each other. Each node 26 includes one or more instruction processors 18, a main storage controller 21, and a main storage 23.

In the embodiment, the main storage 23 includes a level 2 cache 24. The cache 24 serves as a cache dedicated to a remote node.

Specifically, the cache 24a contains only a copy of the main storage 23a.

Although the cache 24 is desirably arranged in the main storage 23 in the embodiment, it is also possible to dispose an independent cache memory. The cache 24 is not disposed in the main storage. Although not shown in FIG. 5, a level 1 cache is arranged in each instruction processor 18.

Figure 4:
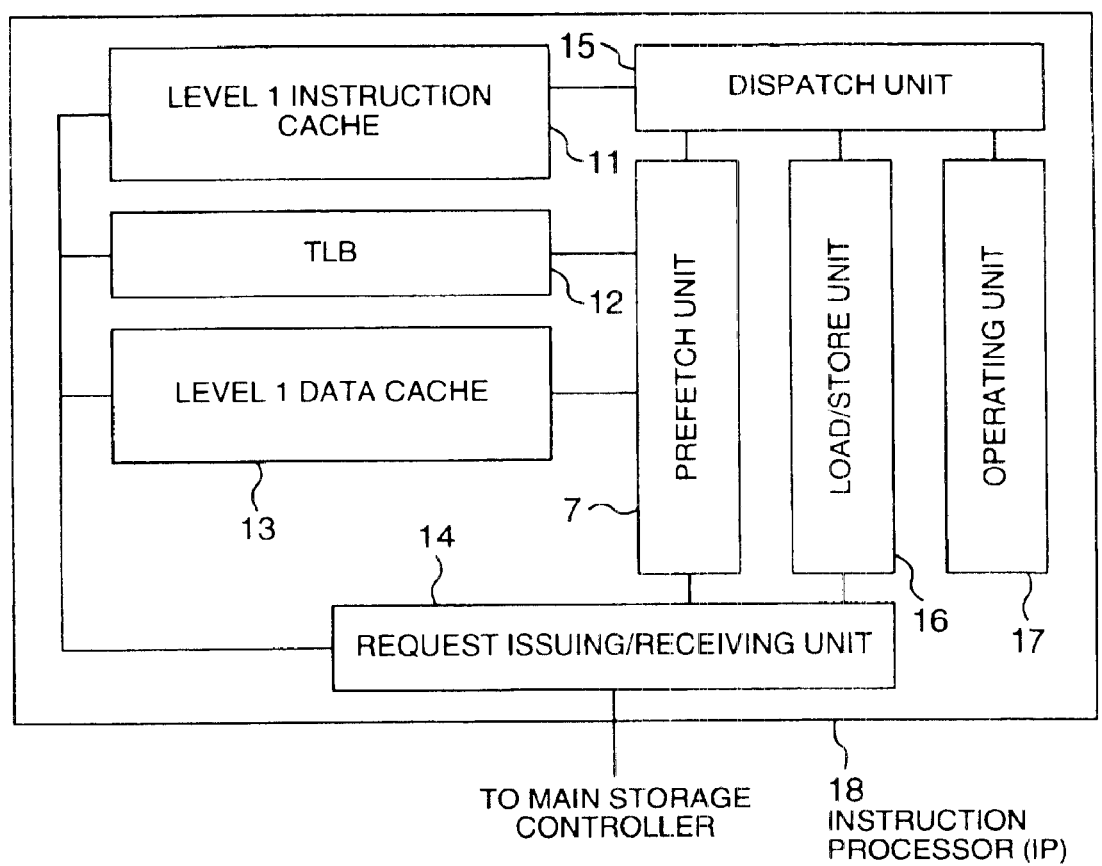
FIG. 4 is a diagram showing a configuration example of an instruction processor in an embodiment of the present invention.

As shown in FIG. 4, the processor 18 includes a level 1 instruction cache 11, a level 1 data cache 13, a translation lookaside buffer (TLB) 12, a dispatch unit 15, a load/store unit 16, an operating unit 17, a prefetch unit 7, and a request issuing/receiving unit 14.

As shown in FIG. 1, the prefetch unit 7 includes an address translator or converter 1, a prefetch type determiner 2, an address determiner 3, a cache tag checker 4, a prefetch requester 5, and an instruction completion processor 6.

The instruction for prefetch varies, in the contents of processing specified by an operation code thereof, depending on an address specified by an operand of the instruction, specifically, whether the address is associated with a local node or a remote node.

Figure 6:
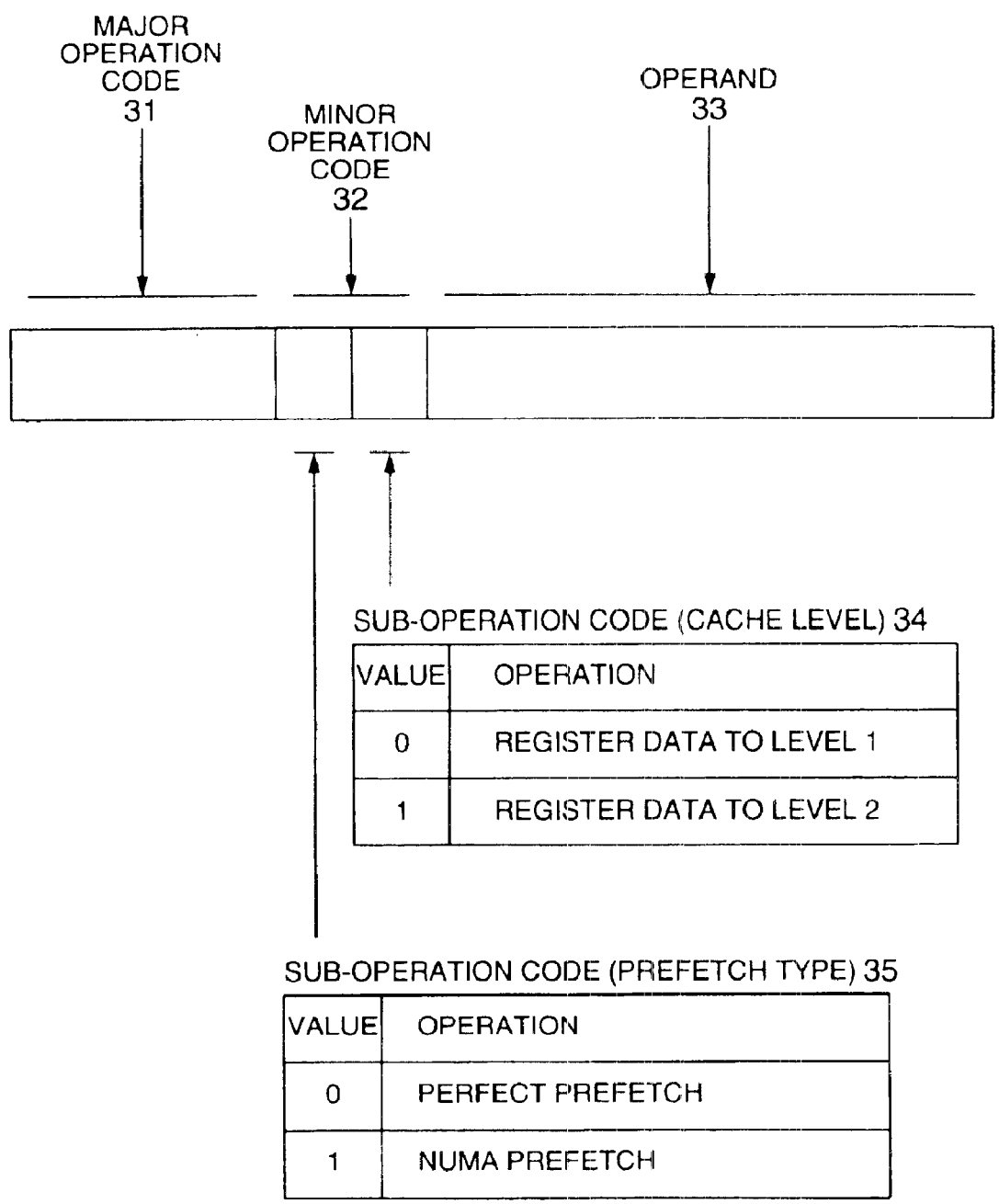
FIG. 6 is a diagram showing an instruction format of a prefetch instruction in an embodiment of the present invention.

FIG. 6 shows an instruction format of the prefetch instruction including "perfect prefetch instruction" and "NUMA prefetch instruction".

The prefetch instruction includes a major operation code 31 indicating prefetch, a minor operation code 32 indicating a type of prefetch, and an operand 33 indicating an address for the prefetch operation.

The minor operation code 32 includes a subordinate operation code 34 specifying a level of a cache to store prefetched data and a subordinate operation code 35 indicating a type of prefetch, namely, perfect prefetch or NUMA prefetch.

When the subordinate operation code 34 contains a value of zero, the prefetched data is stored in the level 1 data cache.

When the subordinate operation code 34 contains a value of one, the prefetched data is stored in the level 2 data cache.

When the subordinate operation code 35 contains a value of zero, the instruction is a perfect prefetch instruction. When the code 35 contains a value of one, the instruction is an NUMA prefetch instruction. In this connection, the perfect prefetch instruction is substantially equal to the prefetch instruction used in the prior art.

When an instruction of which the major operation code 31 is decoded by the dispatch unit 15 and is resultantly recognized as a prefetch instruction, control is passed to the prefetch unit 7.

Description will now be given of processing of the prefetch instruction, specifically, processing of "NUMA prefetch instruction" and processing of "perfect prefetch instruction". Assume in the description below that the instruction processor of the node 26a issues the prefetch instruction. Processing of NUMA prefetch instruction The major operation code 31 indicates prefetch, the subordinate operation code 35 for a prefetch type is set to "1" indicating NUMA prefetch, and the subordinate operation code 34 for a cache level is ordinarily set to "1" to store data in a level 2 data cache. However, the subordinate operation code 34 may also be set to "0".

The address translator 1 of the prefetch unit 7 converts a logical address specified by the operand 33 into a physical address using the TLB 12.

The prefetch type determiner 2 checks the subordinate operation code 35 to determine whether the instruction is a perfect prefetch instruction or an NUMA prefetch instruction. In this case, the instruction is recognized as an NUMA prefetch instruction.

For the NUMA prefetch instruction, the address determiner 3 determines whether the physical address is associated with a local node or a remote node.

If the determiner 3 determines that the address is associated with a local node, subsequent processing is not executed. That is, control is passed to the instruction completion processing section to terminate the processing of the instruction. Therefore, the prefetch request is not issued.

If the address is associated with a remote node, the prefetch operation is continuously executed.

When a tag in a target cache level, i.e., the level 2 specified by the subordinate operation code 34 exists in the processor, the cache tag checker 4 checks the tag.

As a result of the tag check, if the address requested by the prefetch instruction indicates data beforehand stored in the specified cache, the prefetch instruction is terminated.

If the cache does not contain the data or if the tag does not exist in the processor, the prefetch requester 5 issues a prefetch request via the request issuing/receiving unit 14 to the main storage controller 21.

In the controller 21, if the data at the address requested by the prefetch instruction exists in the level 2 cache 24a as a result of the tag check of a level 2 cache tag 22a, processing of the prefetch request is terminated. Otherwise, the controller 21 reads data from the main storage 23b of the (remote) node 26b beginning at the specified address and then stores the data in the level 2 cache 24a of the (local) node 26a.

Processing of Perfect Prefetch Instruction

The major operation code 31 indicates prefetch, the subordinate operation code 35 for a prefetch type is set to "0" indicating perfect prefetch, and the subordinate operation code 34 for a cache level is ordinarily set to "0" to store data in a level 1 data cache. However, the subordinate operation code 34 may also be set to "1".

The address translator 1 of the prefetch unit 7 converts a logical address specified by the operand 33 into a physical address using the TLB 12.

The prefetch type determiner 2 checks the subordinate operation code 35 to determine whether the instruction is a perfect prefetch instruction or an NUMA prefetch instruction. In this case, the instruction is recognized as a perfect prefetch instruction.

For the perfect prefetch instruction, when a tag in a target cache level, i.e., the level 1 specified by the subordinate operation code 34 exists in the processor, the cache tag checker 4 checks the tag.

As a result of the tag check, if the address requested by the prefetch instruction indicates data beforehand stored in the specified cache, the prefetch instruction is terminated.

If the cache does not contain the data or if the tag does not exist in the processor, the prefetch requester 5 issues a prefetch request via the request issuing/receiving unit 14 to the main storage controller 21.

The controller 21 reads data from the main storage 23b of the (remote) node 26a beginning at the specified address and then transfers the data to the request receiving unit 14 of the processor having issued the prefetch instruction. In the unit 14, the data is stored in the level 1 cache.

The cache level and the prefetch type are specified by the subordinate operation codes in the instruction code in the embodiment. However, the cache level and the prefetch type can also be specified in the operand.

For example, several low-order bits of a register specified by the operand or low-order bits equivalent to a value specified by the operand may be used for the purpose.

Subsequently, description will be given of a method of optimizing the memory access scheduling by use of the NUMA prefetch instruction.

In pre-processing, an NUMA prefetch instruction is issued for necessary data to a level 2 cache. Next, after the data is completely registered to the level 2 cache, a perfect prefetch instruction to register the data to a level 1 cache is issued. After the pre-processing is finished, a load instruction and/or an arithmetic instruction are/is executed.

That is, for simple loop processing, while an arithmetic operation or the like is being executed for a block after the pre-processing, a perfect prefetch instruction is issued for data necessary for a subsequent block and an NUMA prefetch instruction is issued for data necessary for a further subsequent block.

There is produced a program to execute the processing described above using the NUMA prefetch instruction, the perfect prefetch instruction, the arithmetic instruction, and the like.

Assume that an operation of one block requires a period of time of t, main storage latency in a local node is p, and main storage latency in a remote node (a period of time from when an NUMA prefetch instruction is issued to when data of a main storage in a remote node is registered to a level 2 cache) is r.

The compiler schedules instructions such that during block j is being processed, a perfect prefetch is executed for data necessary for block j+p/t and an NUMA prefetch is executed for data necessary for block j+(p+r)/t.

Figure 7:
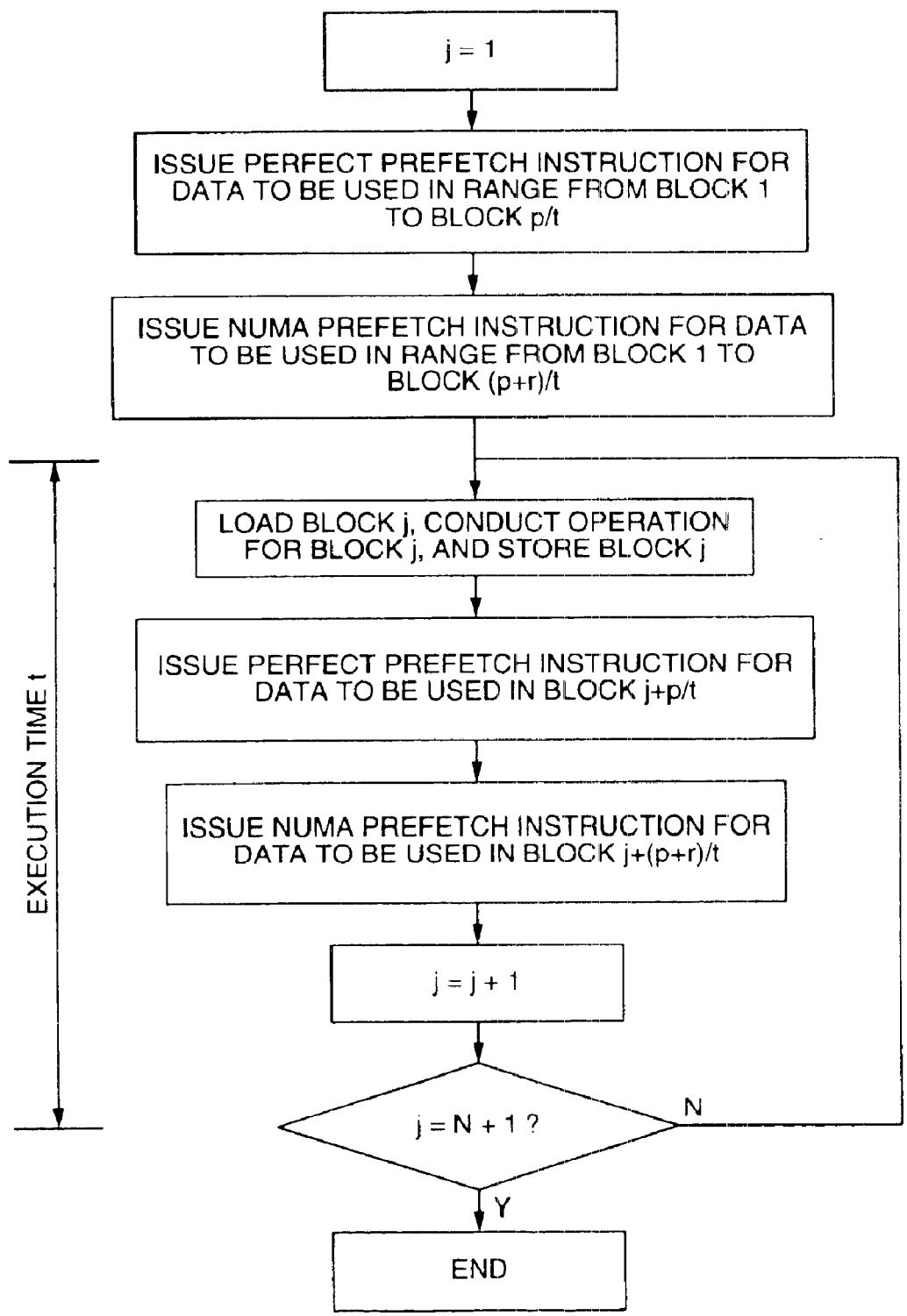
FIG. 7 is an execution flowchart showing execution of instructions according to an instruction schedule including an NUMA prefetch instruction in an embodiment of the present invention.

FIG. 7 shows an execution flowchart for blocks 1 to N, namely, an instruction execution flowchart according to the instruction scheduling described above.

Before processing of the load, arithmetic, and store instructions, pre-processing is executed as below.
(1) A perfect prefetch instruction is issued for data to be used in block 1 to block p/t.
(2) An NUMA prefetch instruction is issued for data to be used in block 1 to block (p+r)/t.
(3) The processing of the load, arithmetic, and store instructions are then executed for block j (having an initial value of one).
(4) A perfect prefetch instruction is issued for data to be used in block j+p/t.
(5) An NUMA prefetch instruction is issued for data to be used in block j+(p+r)/t.
(6) j=j+1 is executed.
(7) A check is made to determine whether or not j=N+1. If this results in no, control returns to (3); otherwise, the processing is terminated.

The total execution time ranging from (3) to (7) is t.

In place of the level 2 cache of the embodiment or in addition thereto, a high-level cache may be arranged in the main storage controller 21 or the processor 18 such that the high-level cache is used as a target of the NUMA prefetch instruction.

FIG. 8 shows examples of the instruction scheduling.

Specifically, FIG. 8 shows an instruction scheduling example using a perfect prefetch instruction of the prior art (instruction code of the prior art) and an instruction scheduling example using an NUMA prefetch instruction and a perfect prefetch instruction (instruction code of the present invention).

Each example of FIG. 8 is an arithmetic operation to calculate a total as follows.
DO I=1,N
SUM=SUM+a(I)
END DO In the calculation, main storage latency of a local node is set as p=2, main storage latency of a remote node is set as r=2, and execution time of one block is set as t=1. In this case, the examples of FIG. 8 are ideal instruction scheduling generated by a compiler.

In FIG. 8, 1d is a load instruction, add is an instruction of addition, pft is a perfect prefetch instruction, npft is an NUMA prefetch instruction, brc is a conditional branch instruction, &A(k) is a virtual address of A(k), r1 is a register (to temporarily store A(k) in this case), r2 is a register (SUM, initial value is 0), and r3 is a register (index k, initial value is 0).

L1 indicates a level 1 cache (in a processor) and L2 indicates a level 2 cache (in a local main storage).

Moreover, pft L1, &A(1) means that data at address A(1) indicated by a virtual address is prefetched to a level 1 cache, and npft L2, &A(1) means that data at address A(1) indicated by a virtual address is prefetched to a level 2 cache.

A line of ld rl, &A(r3) means that data is loaded in a register rl.

An instruction "add r2, r2, r1" indicates that data of register r2 is added to data of register r1 to store a result of the addition in register r2.

Additionally, brc LOOP, (r3&1t;=N) means an operation of a loop is executed if r3&1t;=N and the loop is not executed in other cases.

As can be seen from the examples of FIG. 8, the number of instructions is increased according to the described embodiments of the present invention.

However, the number of cycles in the columns of the prior art can be achieved in the prior art only if five perfect prefetch instructions can be issued at the same time (on the fly). In other words, the processor must include resources to control five prefetch operations at the same time.

According to the described embodiments of the present invention, it is only necessary to issue two perfect prefetch instructions at the same time. In the worst case, five NUMA prefetch instructions are issued. However, NUMA prefetch instructions are invalidated in most cases, and hence it is not necessary to substantially increase the resources in this situation.

Assume, for example, that the probability of presence of A(k) in a local node is 80% and that of A(k) in a remote node is 20%. Then, every fifth NUMA prefetch instruction is effective. Therefore, only one resource is required in the operation.

According to the described embodiments of the present invention, the target latency of the perfect prefetch instruction can be the local node access latency, not the remote node access latency. That is, a request of long latency does not occupy resources of the processor for a long period of time. Therefore, the cycle of the prefetch request can be minimized and the program can be more efficiently executed.

Although the number of instructions to be executed is increased in the present invention when compared with the prior art, most data ordinarily used exists in main storages of local nodes. Therefore, in the processing of most NUMA prefetch instruction, it is not required to prefetch data from a remote node in most cases.

According to the described embodiments of the present invention, such a prefetch operation from a remote node associated with an NUMA prefetch instruction is controlled by the main storage controller, not the processor. This advantageously prevents concentration of load on the processor.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A multiprocessor system having distributed shared memory, comprising a plurality of nodes connected via an inter-node interface, each of the nodes including at least one processor, a main storage controller, and a main storage belonging to the distributed shared memory with an individual memory address, wherein each processor comprises instruction executing means for executing an NUMA prefetch instruction, the instruction executing means includes an address determiner which terminates the processing of the NUMA prefect instruction without conducting a prefetch operation if an address specified in the NUMA prefetch instruction is associated with a local node, to which the processor belongs, and which issues, only if the address is associated with a remote node other than the local node, a prefetch request to a main storage controller of the local node.

2. A multiprocessor system having distributed shared memory according to claim 1, wherein the main storage controller of the local node comprises means for reading, when the prefetch request is received, data via a main storage controller of the remote node from a main storage of the remote node, the data being at the address specified in the NUMA prefetch instruction and for storing the data in a cache disposed in a main storage of the local node.

3. An instruction scheduling method for use in a multiprocessor system having distributed shared memory and comprising a plurality of nodes connected via an inter-node interface, each of the nodes including at least one processor each of which includes a first level cache, a main storage controller, a main storage belonging to the distributed shared memory with an individual memory address, and a second level cache, the method being used in each of the processor, wherein each of the processor issues a first prefetch instruction specifying an address block containing data to be used by the processor, the first prefetch instruction indicating that when the address specifies a local node to which the processor belongs, the processing of the first prefetch instruction is terminated without conducting a prefetch operation, and only when the address specifies a remote node other than the local note, the data is prefetched from the remote node to the second level cache of the local node, and the processor then issues a second prefetch instruction indicating an address block equal to the address block specified in the first prefetch instruction, the second prefetch instruction indicating that the data is prefetched to the first level cache.

4. An instruction scheduling method for use in a multiprocessor system having distributed shared memory and comprising a plurality of nodes connected via an inter-node interface, the node including one or more processors each of which includes a first level cache, a main storage controller, a main storage, and a second level cache, the method being used in each of the processors, wherein each of the processors issues a first prefetch instruction specifying an address block containing data to be used by the processor, the first prefetch instruction indicating that when the address specifies a local node, a prefetch operation is not conducted, and only when the address specifies a remote node, the data is prefetched from the remote node to the second level cache of the local node, wherein the processor then issues a second prefetch instruction indicating an address block equal to the address block specified in the first prefetch instruction, the second prefetch instruction indicating that the data is prefetched to the first level cache, and wherein the processor issues, after the first prefetch instruction for the address block, the second prefetch instruction for the address block when a period of time fully lapses for termination of execution the first prefetch instruction.

* * * * *